(12) United States Patent
Roberts

(10) Patent No.: US 10,830,400 B2
(45) Date of Patent: Nov. 10, 2020

(54) ENVIRONMENTAL SIMULATION FOR INDOOR SPACES

(71) Applicant: IDEAL Industries Lighting LLC, Sycamore, IL (US)

(72) Inventor: John Roberts, Durham, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 16/259,491

(22) Filed: Jan. 28, 2019

(65) Prior Publication Data

US 2019/0242539 A1     Aug. 8, 2019

Related U.S. Application Data

(60) Provisional application No. 62/628,131, filed on Feb. 8, 2018.

(51) Int. Cl.
| | |
|---|---|
| *F21S 8/06* | (2006.01) |
| *H05B 45/20* | (2020.01) |
| *F21S 8/00* | (2006.01) |
| *H05B 47/11* | (2020.01) |
| *H05B 47/12* | (2020.01) |
| *H05B 47/175* | (2020.01) |

(52) U.S. Cl.
CPC .............. *F21S 8/006* (2013.01); *H05B 45/20* (2020.01); *H05B 47/11* (2020.01); *H05B 47/12* (2020.01); *H05B 47/175* (2020.01)

(58) Field of Classification Search
None
See application file for complete search history.

(56) References Cited

U.S. PATENT DOCUMENTS

| | | |
|---|---|---|
| 4,679,086 A | 7/1987 | May |
| 6,185,444 B1 | 2/2001 | Ackerman et al. |
| 6,470,453 B1 | 10/2002 | Vilhuber |
| | (Continued) | |

FOREIGN PATENT DOCUMENTS

| | | |
|---|---|---|
| EP | 2709428 A2 | 3/2014 |
| EP | 2918901 A1 | 9/2015 |
| | (Continued) | |

OTHER PUBLICATIONS

Examination Report for European Patent Application No. 17705540.7, dated Jul. 26, 2019, 8 pages.

(Continued)

*Primary Examiner* — Dedei K Hammond
(74) *Attorney, Agent, or Firm* — Withrow & Terranova, P.L.L.C.

(57) ABSTRACT

A process for providing a desired environment in an indoor space includes providing light from one or more light sources suitable for meeting a set of general illumination parameters and dynamically adjusting the light from the one or more light sources based on a set of simulated environment illumination parameters while maintaining the light within the general illumination parameters. By dynamically adjusting the light from the one or more light sources, the feelings of the desired environment may be evoked within the indoor space. By maintaining the light output within the set of general illumination parameters, the effect of the dynamic adjustment may minimize distraction caused thereby.

18 Claims, 12 Drawing Sheets

(56) References Cited

U.S. PATENT DOCUMENTS

| | | |
|---|---|---|
| 6,647,426 B2 | 11/2003 | Mohammed |
| 7,344,279 B2 | 3/2008 | Mueller et al. |
| 8,035,320 B2 | 10/2011 | Sibert |
| 9,030,103 B2 | 5/2015 | Pickard |
| 9,039,746 B2 | 5/2015 | van de Ven et al. |
| 9,155,165 B2 | 10/2015 | Chobot |
| 9,456,482 B1 | 9/2016 | Pope et al. |
| 9,681,510 B2 | 6/2017 | van de Ven |
| 9,686,477 B2 | 6/2017 | Walters et al. |
| 9,706,617 B2 | 7/2017 | Carrigan et al. |
| 9,710,691 B1 | 7/2017 | Hatcher et al. |
| 9,730,289 B1 | 8/2017 | Hu et al. |
| 9,769,900 B2 | 9/2017 | Underwood et al. |
| 9,888,546 B2 | 2/2018 | Deese et al. |
| 9,894,740 B1 | 2/2018 | Liszt et al. |
| 10,165,650 B1 | 12/2018 | Fini et al. |
| 10,203,103 B2 | 2/2019 | Bendtsen et al. |
| 2005/0128751 A1 | 6/2005 | Roberge et al. |
| 2006/0002110 A1 | 1/2006 | Dowling et al. |
| 2006/0022214 A1 | 2/2006 | Morgan et al. |
| 2006/0071780 A1 | 4/2006 | McFarland |
| 2006/0074494 A1 | 4/2006 | McFarland |
| 2006/0095170 A1 | 5/2006 | Yang et al. |
| 2007/0061050 A1 | 3/2007 | Hoffknecht |
| 2008/0125161 A1 | 5/2008 | Ergen et al. |
| 2008/0218334 A1 | 9/2008 | Pitchers et al. |
| 2008/0273754 A1 | 11/2008 | Hick et al. |
| 2009/0045971 A1 | 2/2009 | Simons et al. |
| 2009/0066473 A1 | 3/2009 | Simons |
| 2009/0262189 A1 | 10/2009 | Marman |
| 2009/0290765 A1 | 11/2009 | Ishii et al. |
| 2010/0182294 A1 | 7/2010 | Roshan et al. |
| 2010/0226280 A1 | 9/2010 | Burns et al. |
| 2010/0262296 A1 | 10/2010 | Davis et al. |
| 2010/0295946 A1 | 11/2010 | Reed et al. |
| 2011/0007168 A1 | 1/2011 | Nagara et al. |
| 2011/0031897 A1 | 2/2011 | Henig et al. |
| 2011/0057581 A1 | 3/2011 | Ashar et al. |
| 2011/0199004 A1 | 8/2011 | Henig et al. |
| 2011/0211758 A1 | 9/2011 | Joshi et al. |
| 2012/0038281 A1 | 2/2012 | Verfuerth |
| 2012/0143357 A1 | 6/2012 | Chemel et al. |
| 2012/0146518 A1 | 6/2012 | Keating et al. |
| 2012/0235579 A1 | 9/2012 | Chemel et al. |
| 2012/0320626 A1 | 12/2012 | Quilici et al. |
| 2013/0182906 A1 | 7/2013 | Kojo et al. |
| 2013/0221203 A1 | 8/2013 | Barrilleaux |
| 2013/0257292 A1 | 10/2013 | Verfuerth et al. |
| 2013/0293877 A1 | 11/2013 | Ramer et al. |
| 2013/0307419 A1 | 11/2013 | Simonian et al. |
| 2014/0001963 A1 | 1/2014 | Chobot et al. |
| 2014/0028199 A1 | 1/2014 | Chemel |
| 2014/0028200 A1 | 1/2014 | Van Wagoner et al. |
| 2014/0062312 A1 | 3/2014 | Reed |
| 2014/0070724 A1 | 3/2014 | Gould et al. |
| 2014/0072211 A1 | 3/2014 | Kovesi et al. |
| 2014/0103833 A1 | 4/2014 | Ho et al. |
| 2014/0135017 A1 | 5/2014 | Hirano et al. |
| 2014/0159577 A1 | 6/2014 | Manoukis et al. |
| 2014/0167653 A1 | 6/2014 | Chobot |
| 2014/0211985 A1 | 7/2014 | Polese et al. |
| 2014/0217261 A1 | 8/2014 | De Groot et al. |
| 2014/0266916 A1 | 9/2014 | Pakzad et al. |
| 2014/0266946 A1 | 9/2014 | Bily et al. |
| 2014/0267703 A1 | 9/2014 | Taylor et al. |
| 2014/0340570 A1 | 11/2014 | Meyers et al. |
| 2015/0008831 A1 | 1/2015 | Carrigan et al. |
| 2015/0084503 A1 | 3/2015 | Liu et al. |
| 2015/0097975 A1 | 4/2015 | Nash et al. |
| 2015/0195855 A1 | 7/2015 | Liu |
| 2015/0208490 A1 | 7/2015 | Bishop et al. |
| 2015/0245451 A1 | 8/2015 | Sung et al. |
| 2015/0264779 A1 | 9/2015 | Olsen et al. |
| 2015/0264784 A1 | 9/2015 | Romano |
| 2015/0305119 A1 | 10/2015 | Hidaka et al. |
| 2015/0309174 A1 | 10/2015 | Giger |
| 2015/0351169 A1 | 12/2015 | Pope et al. |
| 2015/0370848 A1 | 12/2015 | Yach et al. |
| 2015/0373808 A1 | 12/2015 | Kuo et al. |
| 2016/0069978 A1 | 3/2016 | Rangarajan et al. |
| 2016/0095189 A1 | 3/2016 | Vangeel et al. |
| 2016/0100086 A1 | 4/2016 | Chien |
| 2016/0112870 A1 | 4/2016 | Pathuri |
| 2016/0124081 A1 | 5/2016 | Charlot et al. |
| 2016/0192458 A1 | 6/2016 | Keith |
| 2016/0195252 A1 | 7/2016 | Wilcox et al. |
| 2016/0205749 A1 | 7/2016 | Creusen et al. |
| 2016/0212830 A1 | 7/2016 | Erdmann et al. |
| 2016/0227618 A1 | 8/2016 | Meerbeek et al. |
| 2016/0270179 A1 | 9/2016 | Ryhorchuk et al. |
| 2016/0273723 A1 | 9/2016 | Van Gheluwe et al. |
| 2016/0282126 A1 | 9/2016 | Watts et al. |
| 2016/0286619 A1 | 9/2016 | Roberts et al. |
| 2017/0013697 A1 | 1/2017 | Engelen et al. |
| 2017/0048952 A1 | 2/2017 | Roberts et al. |
| 2017/0094750 A1 | 3/2017 | Chen |
| 2017/0167708 A1 | 6/2017 | Kim et al. |
| 2017/0228874 A1 | 8/2017 | Roberts |
| 2017/0230364 A1 | 8/2017 | Barile et al. |
| 2017/0231045 A1 | 8/2017 | Hu et al. |
| 2017/0231060 A1 | 8/2017 | Roberts et al. |
| 2017/0231061 A1 | 8/2017 | Deese et al. |
| 2017/0231066 A1 | 8/2017 | Roberts et al. |
| 2017/0257925 A1* | 9/2017 | Forbis ................... H05B 45/20 |
| 2017/0366970 A1 | 12/2017 | Yu |
| 2018/0216791 A1 | 8/2018 | Leung et al. |
| 2018/0246270 A1 | 8/2018 | Di Trapani et al. |
| 2018/0252374 A1 | 9/2018 | Keller et al. |
| 2018/0259140 A1 | 9/2018 | Keller et al. |
| 2018/0359838 A1 | 12/2018 | Liszt et al. |

FOREIGN PATENT DOCUMENTS

| | | |
|---|---|---|
| JP | 2010141663 A | 6/2010 |
| JP | 2012243206 A | 12/2012 |
| JP | 2016051608 A | 4/2016 |
| WO | 03067934 A2 | 8/2003 |
| WO | 2009011898 A2 | 1/2009 |
| WO | 2010004514 A1 | 1/2010 |
| WO | 2012143814 A1 | 10/2012 |
| WO | 2013121342 A2 | 8/2013 |
| WO | 2013158955 A1 | 10/2013 |
| WO | 2014147524 A1 | 9/2014 |
| WO | 2015103482 A1 | 7/2015 |
| WO | 2017045885 A1 | 3/2017 |

OTHER PUBLICATIONS

Examination Report for European Patent Application No. 17708904.2, dated Aug. 2, 2019, 9 pages.

International Preliminary Report on Patentability for International Patent Application No. PCT/US2018/037048, dated Dec. 26, 2019, 9 pages.

Notice of Allowance for U.S. Appl. No. 15/972,176, dated Jun. 19, 2019, 8 pages.

Notice of Allowance for U.S. Appl. No. 15/972,178, dated Jun. 17, 2019, 9 pages.

International Search Report and Written Opinion for PCT/US2019/016592, dated Apr. 17, 2019, 16 pages.

Abdi, Hervé, "Metric Multidimensional Scaling (MDS): Analyzing Distance Matrices," Encyclopedia of Measurement and Statistics, 2007, Thousand Oaks, California, SAGE Publications, Inc., 13 pages.

Author Unknown, "Procrustes analysis," https://en.wikipedia.org/wiki/Procrustes_analysis, Jul. 16, 2016, Wikipedia, 5 pages.

Author Unknown, "Thread Commissioning," Revision 2.0, Jul. 13, 2015, Thread Group, Inc., www.threadgroup.org, 26 pages.

Author Unknown, "Thread Stack Fundamentals," Revision 2.0, Jul. 13, 2015, Thread Group, Inc., www.threadgroup.org, 21 pages.

Author Unknown, "The IES TM-30-15 Method," Lighting Passport, Available online at: <<https://www.lightingpassport.com/ies-tm30-15-method.html>>, Jan. 15, 2016, 6 pages.

(56) References Cited

OTHER PUBLICATIONS

Roots, Byron, et al., "A Spectral Learning Approach to Range-Only SLAM," Proceedings of the 30th International conference on Machine Learning, vol. 28, 2013, Atlanta, Georgia, JMLR Workshop and Conference Proceedings, 8 pages.
Cree, "Cree® J Series™ 2835 LEDs," Product Family Data Sheet: CLJ-DS8 REV 0D, Cree, Inc., Available online at: <<http://www.cree.com/led-components/media/documents/data-sheet-JSeries-2835.pdf>>, 2017, 30 pages.
Digeronimo, J., "EIC 2800 Search Report," Scientific and Technical Information Center, dated Mar. 14, 2018, 33 pages.
Figueiro, M. G., et al., "Light at Night and Measures of Alertness and Performance: Implications for Shift Workers," Biological Research for Nursing, vol. 18, Issue 1, Feb. 19, 2015, pp. 90-100.
Jacobson, J., "CoeLux: The $40,000 Artificial Skylight Everyone Will Want," CE Pro, Available online at: <<https://www.cepro.com/article/coelux_the_40000_fake_skylight_everyone_will_want>>, Mar. 11, 2016, 9 pages.
Kobourov, Stephen, G., "Force-Directed Drawing Algorithms," Handbook of Graph Drawing and Visualization, Chapter 12, 2013, CRC Press, pp. 383-408.
Lumileds, "DS146 LUXEON 3535L Color Line," Product Datasheet, Lumileds Holding B.V., Available online at: <<https://www.lumileds.com/uploads/565/DS146-pdf>>, 2018, 18 pages.
Rea, M. S., et al., "A model of phototransduction by the human circadian system," Brain Research Reviews, vol. 50, Issue 2, Dec. 15, 2005, pp. 213-228.
Rea, M. S., et al., "Circadian light," Journal of Circadian Rhythms, vol. 8, No. 2, Feb. 13, 2010, 11 pages.
Sahin, L., et al., "Alerting effects of short-wavelength (blue) and long-wavelength (red) lights in the afternoon," Physiology & Behavior, vols. 116-117, May 27, 2013, pp. 1-7.
Seoul Semiconductor, "STB0A12D—Mid-Power LED—3528 Series Product Data Sheet," Seoul Semiconductor Co., Ltd., Revision 1.0, Available online at: <<http://www.seoulsemicon.com/upload2/3528_STB0A12D_Spec_Rev1.0.pdf>>, Jul. 21, 2017, 19 pages.
Seoul Semiconductor, "STG0A2PD—Mid-Power LED—3528 Series Product Data Sheet," Seoul Semiconductor Co., Ltd., Revision 1.0, Available online at: <<http://www.seoulsemicon.com/upload2/3528_STG0A2PD_Spec_Rev1.0.pdf>>, Jul. 21, 2017, 19 pages.
International Preliminary Report on Patentability for International Patent Application No. PCT/US2017/016469, dated Aug. 23, 2018, 10 pages.
Non-Final Office Action for U.S. Appl. No. 15/192,308, dated Jul. 3, 2017, 11 pages.
Final Office Action for U.S. Appl. No. 15/192,308, dated Oct. 20, 2017, 12 pages.
Advisory Action and Interview Summary for U.S. Appl. No. 15/192,308, dated Jan. 25, 2018, 5 pages.
Non-Final Office Action for U.S. Appl. No. 15/192,308, dated Mar. 15, 2018, 10 pages.
Final Office Action for U.S. Appl. No. 15/192,308, dated Jul. 12, 2018, 11 pages.
Advisory Action for U.S. Appl. No. 15/192,308, dated Sep. 10, 2018, 3 pages.
Examiner's Answer for U.S. Appl. No. 15/192,308, dated Mar. 6, 2019, 5 pages.
Non-Final Office Action for U.S. Appl. No. 15/192,479, dated Jan. 6, 2017, 17 pages.
Non-Final Office Action for U.S. Appl. No. 15/192,479, dated Dec. 15, 2017, 11 pages.
Notice of Allowance for U.S. Appl. No. 15/192,479, dated May 9, 2018, 7 pages.
Non-Final Office Action for U.S. Appl. No. 15/192,035, dated May 31, 2017, 19 pages.
Final Office Action for U.S. Appl. No. 15/192,035, dated Sep. 14, 2017, 15 pages.
Advisory Action for U.S. Appl. No. 15/192,035, dated Dec. 1, 2017, 3 pages.
Non-Final Office Action for U.S. Appl. No. 15/192,035, dated Mar. 9, 2018, 16 pages.
Final Office Action for U.S. Appl. No. 15/192,035, dated Aug. 1, 2018, 20 pages.
Advisory Action for U.S. Appl. No. 15/192,035, dated Sep. 24, 2018, 3 pages.
Notice of Allowance for U.S. Appl. No. 15/192,035, dated Nov. 6, 2018, 8 pages.
Non-Final Office Action for U.S. Appl. No. 15/191,846, dated Mar. 22, 2017, 12 pages.
Notice of Allowance for U.S. Appl. No. 15/191,846, dated Jul. 13, 2017, 8 pages.
Non-Final Office Action for U.S. Appl. No. 15/191,753, dated Aug. 1, 2018, 11 pages.
Notice of Allowance for U.S. Appl. No. 15/191,753, dated Jan. 14, 2019, 23 pages.
Notice of Allowance for U.S. Appl. No. 15/621,695, dated Sep. 21, 2017, 8 pages.
Final Office Action for U.S. Appl. No. 15/849,986, dated Oct. 26, 2018, 7 pages.
Non-Final Office Action for U.S. Appl. No. 15/849,986, dated Apr. 19, 2018, 9 pages.
Notice of Allowance for U.S. Appl. No. 15/849,986, dated Nov. 26, 2018, 8 pages.
Corrected Notice of Allowability and Interview Summary for U.S. Appl. No. 15/849,986, dated Jan. 14, 2019, 6 pages.
International Search Report and Written Opinion for International Patent Application No. PCT/US2017/016448, dated Apr. 6, 2017, 16 pages.
International Preliminary Report on Patentability for International Patent Application No. PCT/US2017/016448, dated Aug. 23, 2018, 10 pages.
International Search Report and Written Opinion for International Patent Application No. PCT/US2017/016454, dated Apr. 6, 2017, 16 pages.
International Preliminary Report on Patentability for International Patent Application No. PCT/US2017/016454, dated Aug. 23, 2018, 10 pages.
International Search Report and Written Opinion for International Patent Application No. PCT/US2017/016469, dated Apr. 6, 2017, 16 pages.
International Search Report and Written Opinion for International Patent Application No. PCT/US2018/037048, dated Aug. 31, 2018, 15 pages.
Summons to Attend Oral Proceedings for European Patent Application No. 17705540.7, mailed Feb. 20, 2020, 9 pages.
Summons to Attend Oral Proceedings for European Patent Application No. 17708904.2, mailed Feb. 20, 2020, 10 pages.
Decision on Appeal for U.S. Appl. No. 15/192,308, dated May 20, 2020, 8 pages.
Notice of Allowance for U.S. Appl. No. 16/657,294, dated May 8, 2020, 8 pages.
Result of Consultation for European Patent Application No. 17705540.7, dated Jul. 31, 2020, 11 pages.
International Preliminary Report on Patentability for PCT/US2019/016592, dated Aug. 20, 2020, 9 pages.
Result of Consultation for European Patent Application No. 17708904.2, dated Aug. 20, 2020, 18 pages.

\* cited by examiner

ENVIRONMENTAL SIMULATION FOR INDOOR SPACES

RELATED APPLICATIONS

This application claims the benefit of provisional patent application Ser. No. 62/628,131, filed Feb. 8, 2018, the disclosure of which is hereby incorporated herein by reference in its entirety.

FIELD OF THE DISCLOSURE

The present disclosure relates to methods for imitating natural environments in indoor spaces while maintaining light suitable for general illumination and apparatuses for accomplishing the same.

BACKGROUND

Studies continue to suggest a relationship between light exposure and certain mental states. One or more qualities of the light to which an individual is exposed (e.g., color temperature, color rendering index, brightness, and the like) may affect the mental state of the individual (e.g., alertness, ability to concentrate, energy level, anxiety level, and the like). Studies have also suggested a relationship between immersion in natural outdoor environments and feelings of wellbeing. However, a large percentage of the population works in indoor environments, often with little to no access to natural light. For these individuals, there is a need to create an indoor environment tailored to create one or more desired mental states and increase feelings of wellbeing.

SUMMARY

In one embodiment, a process for providing a desired environment in an indoor space includes providing light from one or more light sources suitable for meeting a set of general illumination parameters and dynamically adjusting the light from the one or more light sources based on a set of simulated environment illumination parameters while maintaining the light within the general illumination parameters. By dynamically adjusting the light from the one or more light sources, the feelings of the desired environment may be evoked within the indoor space. By maintaining the light output within the set of general illumination parameters, the effect of the dynamic adjustment may minimize distraction caused thereby.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 5:
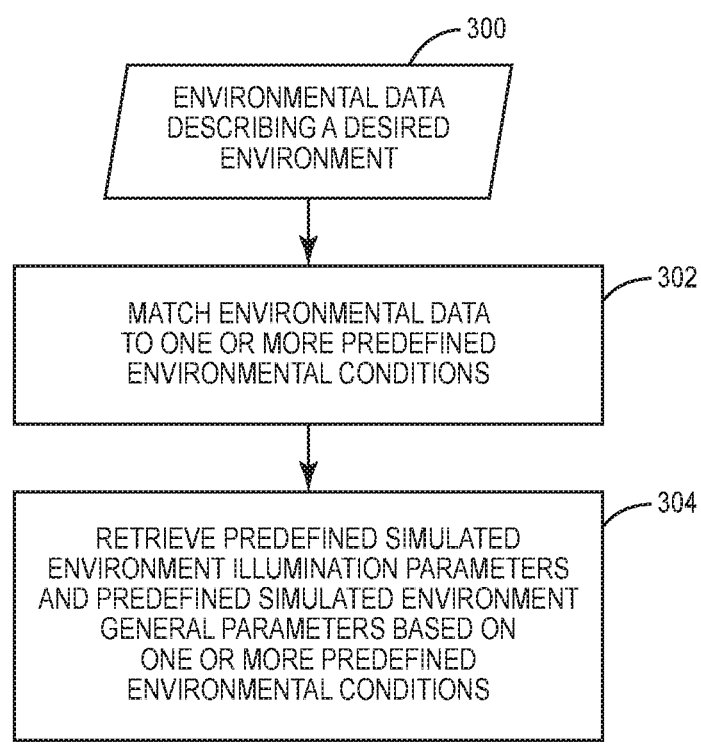

FIG. 5 a flow diagram illustrating a process of obtaining a set of simulated environment illumination parameters and simulated environment general parameters according to one embodiment of the present disclosure.

Figure 6:
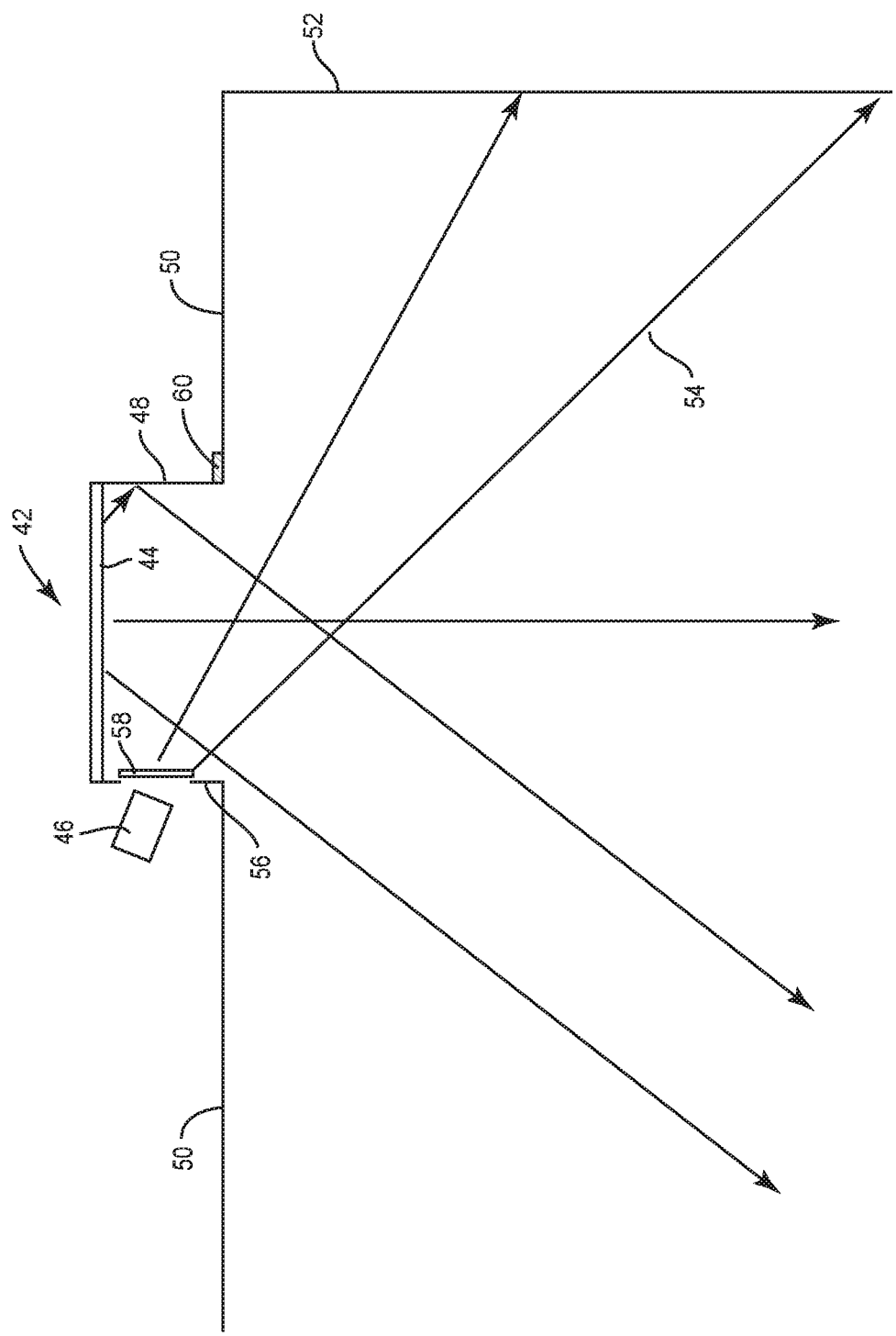

FIG. 6 is a diagram illustrating a lighting fixture according to one embodiment of the present disclosure.

Figure 7:
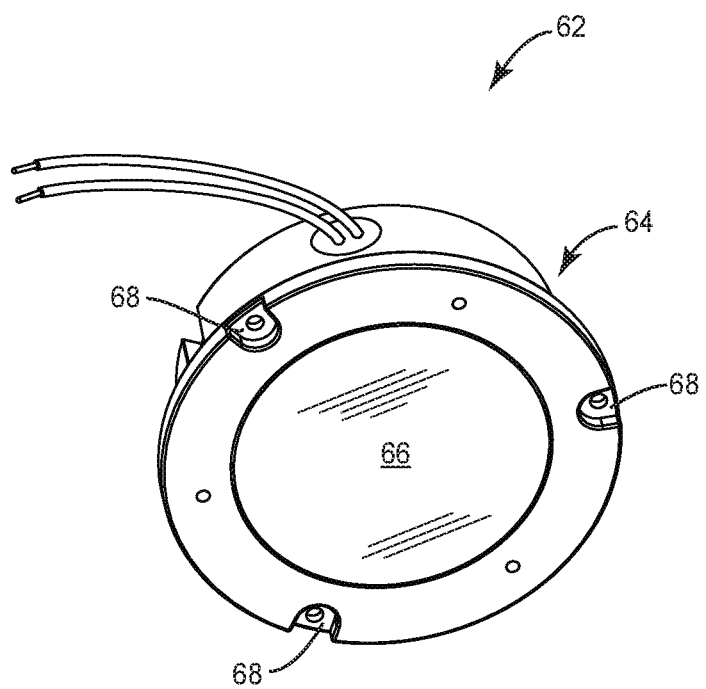

FIG. 7 is a diagram illustrating a lighting fixture according to one embodiment of the present disclosure.

Figure 8:
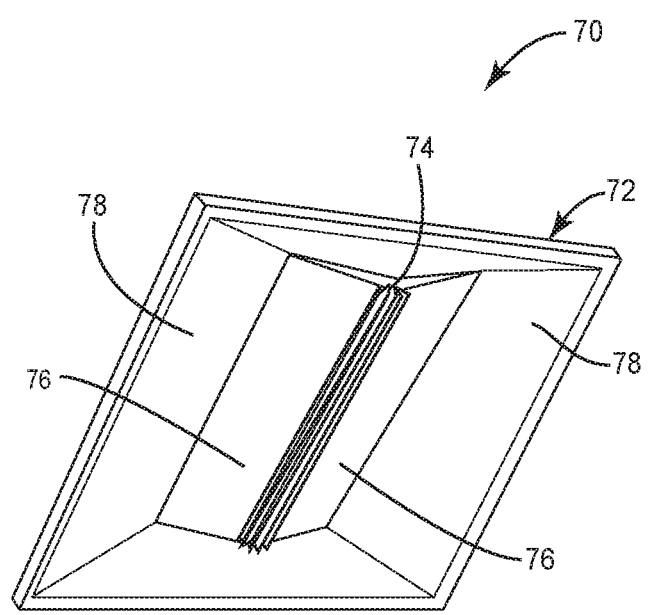

FIG. 8 is a diagram illustrating a lighting fixture according to one embodiment of the present disclosure.

FIGS. 9-12 include graphs and diagrams illustrating lighting parameters suitable for general illumination according to various embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

There is a growing body of research suggesting that time spent in natural outdoor environments provides several psychological benefits. While the particular characteristics of natural outdoor environments responsible for these benefits are elusive, it is clear that the indoor environments in which a large percentage of the population work do not include them. Conventionally, lighting and other environmental characteristics of indoor work environments are focused on meeting the minimum conditions suitable for worker productivity. With respect to lighting, this often means maintaining the light within the indoor space within a set of general illumination parameters. These general illumination parameters include, at the most basic level, a desired brightness level. With the advancement of light engines and their capability to more precisely control the light output therefrom, additional light quality characteristics such as color temperature and color rendering index have been included in these general illumination parameters. With respect to other environmental characteristics, this may include maintaining a noise level below a certain threshold, maintaining a temperature of the space within a desired range, or the like.

While previous generations of lighting fixtures and environmental control devices (e.g., thermostats, white noise generators, and the like) have been limited in their functionality and thus ability to create a specific indoor environment, recent advancements now provide an opportunity to not only provide a minimum threshold for enabling worker productivity, but to cultivate desired mental states and improve feelings of wellbeing.

Figure 1:
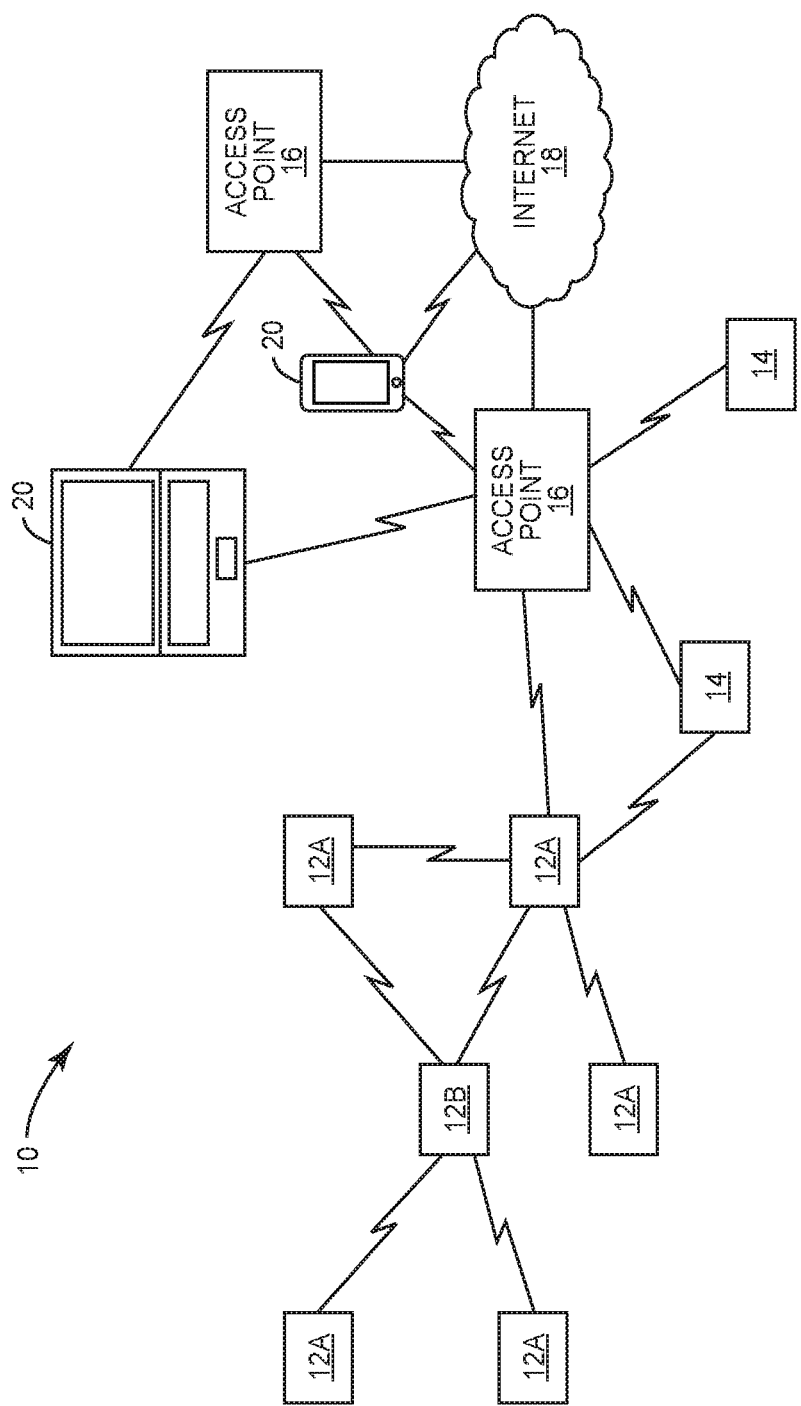
FIG. 1 is a block diagram illustrating a lighting network according to one embodiment of the present disclosure.

With specific reference to lighting, modern light engines including a number of light emitting diodes (LEDs) are capable of providing light having particular characteristics such as brightness, color, color temperature, color rendering index, and the like. Further, modern lighting fixtures may be networked such that they can communicate with one another and one or more other devices, as illustrated in FIG. 1. FIG. 1 shows an exemplary lighting network 10, such as one created by Cree SmartCast lighting fixtures. The lighting network 10 may include lighting fixtures 12A, lighting controls 12B (e.g., switches, touch panel controllers, and the like), and other devices 14 (e.g., white noise controllers, speakers, thermostats, building management system control interfaces, and the like), all of which may communicate with one another via a wired or wireless connection (illustrated by the connections between the lighting fixtures 12A, the lighting controls 12B, and the other devices 14). In one embodiment, the lighting fixtures 12A, the lighting controls 12B, and the other devices 14 form a mesh network; however, any suitable network topology may be used without departing from the principles of the present disclosure. One or more of the lighting fixtures 12A, the lighting controls 12B, and the other devices 14 may connect to an access point 16 in order to access a local area network (LAN) such as a local TCP/IP network or a wide area network (WAN) such as the Internet 18. The access point 16 may enable the lighting fixtures 12A, the lighting controls 12B, and the other devices 14 to communicate with local and/or remote devices on the LAN or WAN, such as end-user devices 20, which may include computers, mobile devices, and the like. Notably, these end-user devices 20 may connect to the lighting fixtures 12A, the lighting controls 12B, and the other devices 14 through the same access point 16, in which case they may be on the same LAN, or through a different access point 16 or mobile communications network via a WAN such as the Internet 18. One or more of the lighting fixtures 12A, the lighting controls 12B, and the other devices 14 may communicate with one another indirectly through the access point 16. Further details regarding the lighting network 10 may be found in co-assigned and co-pending U.S. Patent Publication No. 2017/0230364A1, the contents of which are hereby incorporated by reference in their entirety.

Figure 2:
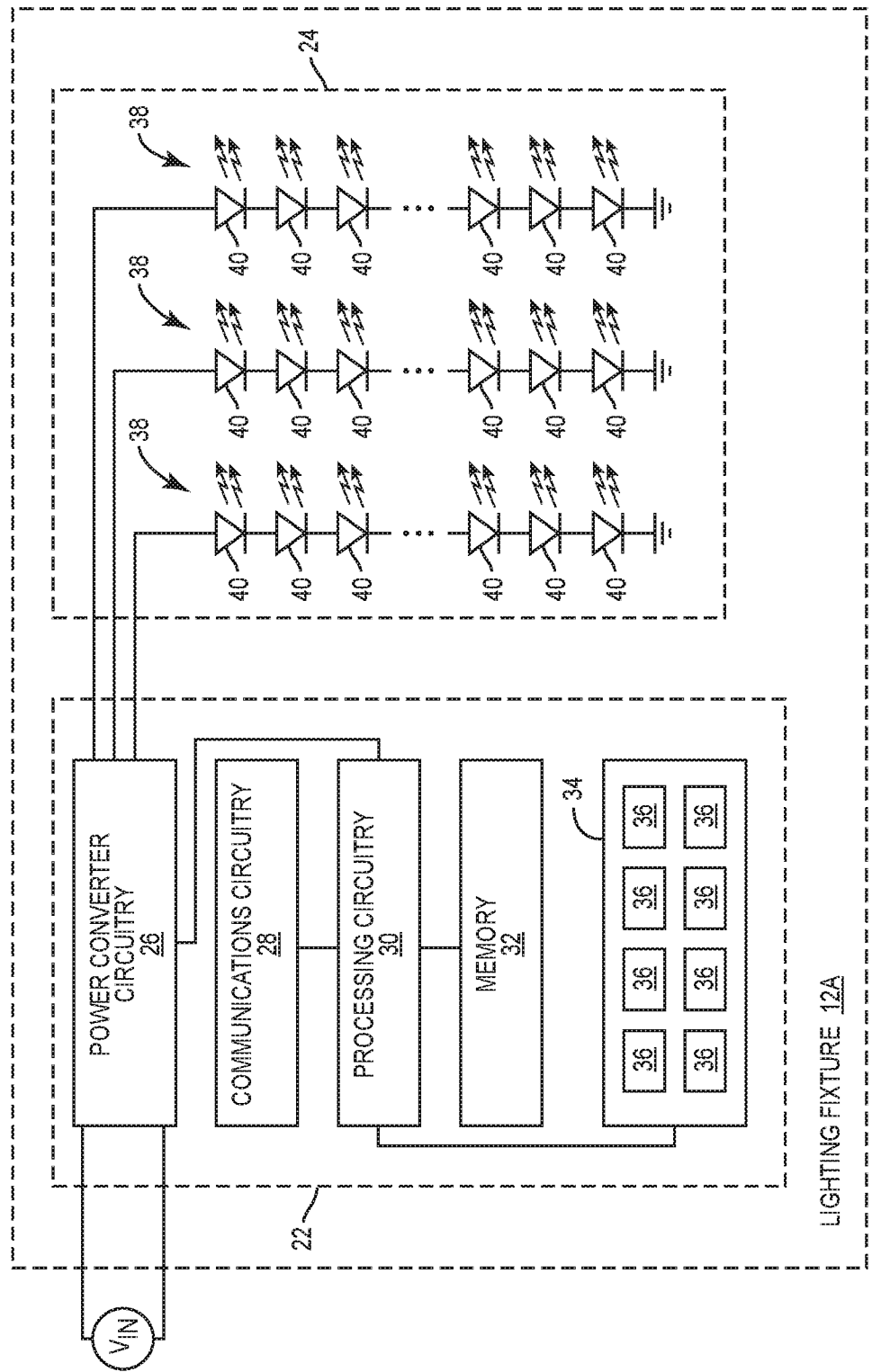
FIG. 2 is a diagram illustrating a lighting fixture according to one embodiment of the present disclosure.

FIG. 2 is a block diagram illustrating details of a lighting fixture 12A according to one embodiment of the present disclosure. The lighting fixture 12A includes driver circuitry 22 and an array of LEDs 24. The driver circuitry 22 includes power converter circuitry 26, communications circuitry 28, processing circuitry 30, a memory 32, and sensor circuitry 34. The power converter circuitry 26 is configured to receive an alternating current (AC) or direct current (DC) input signal ($V_{IN}$) and perform power conversion to provide regulated output power to the array of LEDs 24. In one embodiment, the power converter circuitry 26 is configured to provide a pulse-width modulated (PWM) regulated output signal to the array of LEDs 24 such that the light output thereof can be precisely controlled. While not shown, a connection between the power converter circuitry 26 and each one of the communications circuitry 28, the processing circuitry 30, the memory 32, and the sensor circuitry 34 may provide regulated power to these portions of the driver circuitry 22 as well. The processing circuitry 30 may provide the main intelligence of the lighting fixture 12A, and may execute instructions stored in the memory 32 to do so. The processing circuitry 30 may thus control the amount of current, voltage, or both provided from the power converter circuitry 26 to the array of LEDs 24. The communications circuitry 28 may enable the lighting fixture 12A to communicate via wireless or wired signals to one or more other lighting fixtures 12A, lighting controls 12B, or other devices 14. The communications circuitry 28 may be coupled to the processing circuitry 30 such that information received via the communications circuitry 28 can be considered and acted upon by the processing circuitry 30. The sensor circuitry 34 may include any number of different sensors 36. For example, the sensor circuitry 34 may include one or more passive infrared (PIR) occupancy sensors, one or more ambient light sensors, one or more microphones, one or more speakers, one or more ultrasonic sensors and/or transducers, one or more infrared receivers, one or more imaging sensors such as a camera, a multi-spectral imaging sensor, or the like, one or more atmospheric pressure sensors, one or more temperature and/or humidity sensors, one or more air quality sensors such as oxygen sensors, carbon dioxide sensors, volatile organic compound (VOC) sensors, smoke detectors, and the like, one or more positioning sensors such as accelerometers, Global Positioning Satellite (GPS) sensors, or the like, one or more magnetic field sensors, or any other sensors. The sensor circuitry 34 may be in communication with the processing circuitry 30 such that information from the sensors 36 can be considered and acted upon by the processing circuitry 30. In some situations, the processing circuitry 30 may use information from the sensors 36 to adjust the voltage and/or current provided form the power converter circuitry 26 to the array of LEDs 24, thereby changing one or more aspects of the light provided by the lighting fixture 12A. In other situations, the processing circuitry 30 may communicate information from the sensors 36 via the communications circuitry 28 to one or more other devices. In still other situations, the lighting fixture 12A may both change one or more aspects of the light provided therefrom based on information from the one or more sensors 36 and communicate the information from the one or more sensors 36 via the communications circuitry 28.

In one embodiment, the processing circuitry 30 may combine data from multiple sensors to detect one or more conditions. For example, sensor data from an image sensor may be combined or "fused" with sensor data from a PIR occupancy sensor to accurately detect occupancy, paths of movement, or any other condition. In general, the sensor data from two or more sensors may be combined in any number of ways to detect a desired condition such as occupancy, occupancy level (i.e., the number of people in a given space), paths of movement, the state or location of inventory, or any other environmental condition.

The array of LEDs 24 includes multiple LED strings 38. Each LED string 38 includes a number of LEDs 40 arranged in series between the power converter circuitry 26 and ground. Notably, the disclosure is not limited to lighting fixtures 12A having LEDs 40 arranged in this manner. The LEDs 40 may be arranged in any series/parallel combination, may be coupled between contacts of the power converter circuitry 26, or arranged in any other suitable configuration without departing from the principles described herein. The LEDs 40 in each one of the LED strings 38 may be fabricated from different materials and coated with different phosphors such that the LEDs 40 are configured to provide light having different characteristics than the LEDs in each other LED string 38. For example, the LEDs 40 in a first one of the LED strings 38 may be manufactured such that the light emitted therefrom is green, and include a phosphor configured to shift this green light into blue light. Such LEDs 40 may be referred to as blue-shifted green (BSG) LEDs. The LEDs 40 in a second one of the LED strings 38 may be manufactured such that the light emitted therefrom is blue, and include a phosphor configured to shift this blue light into yellow light. Such LEDs 40 may be referred to as blue-shifted yellow (BSY) LEDs. The LEDs 40 in a third one of the LED strings 38 may be manufactured such that the light emitted therefrom is red, and may be referred to as red (R) LEDs 40. The light output from each LED string 38 may combine to provide light having a desired hue, saturation, brightness, color temperature, color rendering index, and the like. Any different types of LEDs 40 may be provided in each one of the LED strings 38 to achieve any desired light output or any desired range of light output. The power converter circuitry 26 may be capable of individually changing the voltage and/or current through each LED string 38 such that the hue, saturation, brightness, color temperature, color rendering index, and the like, provided by the array of LEDs 40 can be adjusted.

Figure 3:
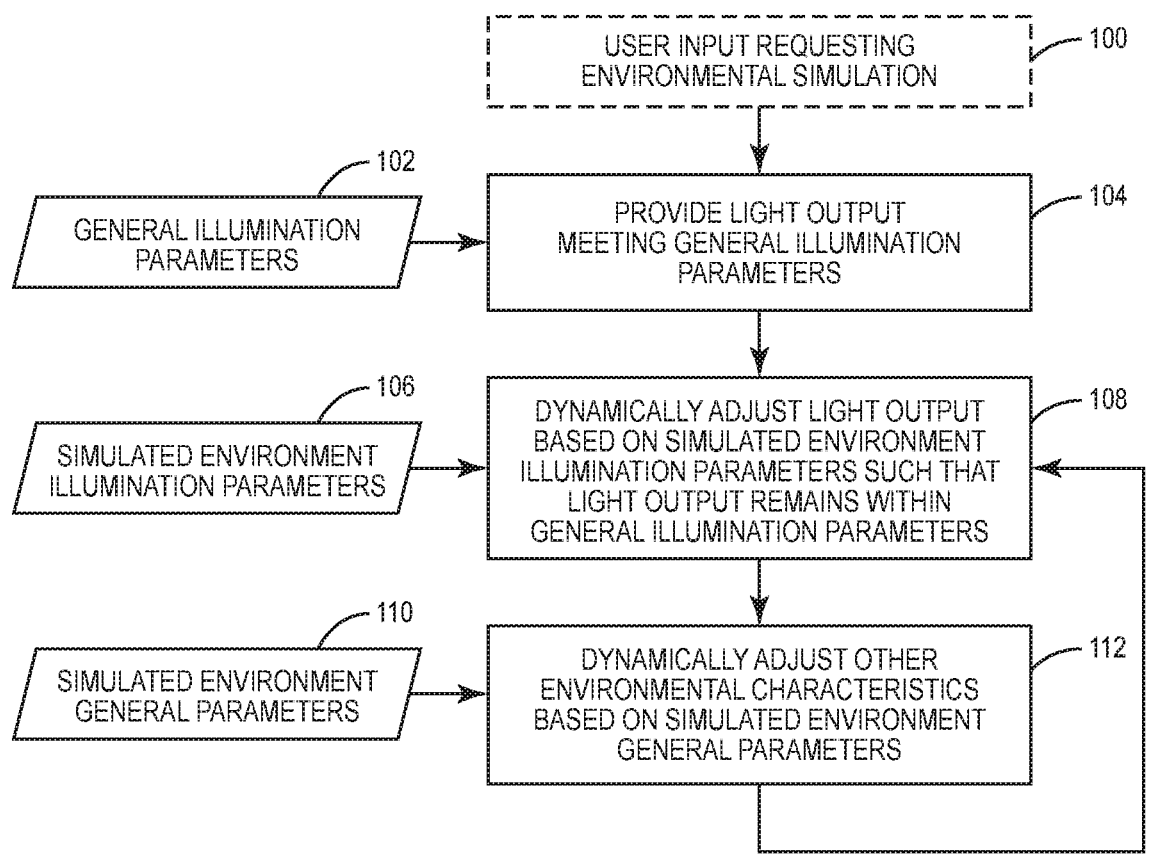
FIG. 3 is a flow diagram illustrating a process for creating a desired environment in an indoor space.

The improvements discussed above may enable a lighting fixture 12A, a group of lighting fixtures 12A, or a group of lighting fixtures 12A and other devices 14 to create indoor environments suitable for cultivating desired mental states and/or improving wellbeing. For example, a lighting fixture 12A, a group of lighting fixtures 12A, or a group of lighting fixtures 12A and other devices 14 may be used to simulate or otherwise evoke a natural outdoor environment in an indoor space. While lighting effects for theater or other performances have previously been used to portray a specific environment or environmental condition in stage settings, these lighting effects are not suitable for indoor spaces in which individuals are required to work such as commercial spaces (e.g., office buildings), hospitals, schools, universities, sports facilities, factories, and the like. In other words, these lighting effects do not provide light suitable for general illumination. In this regard, the lights used to perform these effects are generally not even suitable for providing light suitable for normal tasks, as they are often bright, highly directional, and mounted directionally or on multi-axis gimbals for positioning. FIG. 3 is a flow diagram illustrating a method for creating an indoor environment suitable for working environments such as those listed above that is tailored to provide a desired effect while also providing light suitable for general illumination. Specifically, FIG. 3 illustrates a process for imitating, simulating, or otherwise invoking a feeling of being in a natural outdoor environment in an indoor space while maintaining light suitable for general illumination therein. Rather than providing an exact replica of the lighting and other environmental conditions in a natural outdoor space, the process discussed below with respect to FIG. 3 is focused on giving a subtle impression thereof, giving individuals within the indoor space a perception of the natural outdoor environment without actually being in it. The process discussed with respect to FIG. 3 is targeted for use in lights located in indoor environments suited for general working tasks such as those discussed above. Accordingly, the process discussed with respect to FIG. 3 is targeted for implementation by lights often used in these environments such as troffer lights provided in a drop ceiling, down lights, or the like.

The process is optionally triggered based on input from a user requesting simulation of a particular environment (step 100). In response thereto or based on a different trigger such as a schedule, a set of general illumination parameters (step 102) are used to provide light from one or more lighting fixtures 12A (step 104). As discussed above, these general illumination parameters may include characteristics such as hue, saturation, brightness, color, color temperature, color rendering index, and the like. Further, these general illumination parameters may include a range of acceptable values for any of these characteristics. Next, a set of simulated environment illumination parameters (step 106) are used to dynamically adjust the light output of the one or more lighting fixtures 12A (step 108). For example, if the simulated environment illumination parameters are meant to evoke a feeling of being in a cloud covered outdoor environment, the light output of the one or more lighting fixtures 12A may be dynamically adjusted to imitate shadows produced by the clouds in this environment. As another example, if the simulated environment illumination parameters are meant to evoke a feeling of being in a rainy outdoor environment, the light output of the one or more lighting fixtures 12A may be dynamically adjusted to imitate the absorption, reflection, and refraction of light caused by the clouds and rain in this environment. Notably, this dynamic adjustment is accomplished while maintaining the general illumination parameters discussed above such that the indoor space is still suitable for work tasks (e.g., reading, writing, meetings, teaching, etc.).

There are several ways to maintain the general illumination parameters while dynamically changing the light output from the one or more lighting fixtures 12A based on the simulated environment illumination parameters. In one embodiment, a change in the light output of one of the lighting fixtures 12A is compensated for by an adjacent or otherwise nearby lighting fixture 12A such that an average light output of the lighting fixtures 12A in a particular area meets the general illumination parameters while also dynamically changing to evoke feelings of the desired outdoor or natural environment. This could mean, for example, that as the brightness of one of the lighting fixtures 12A decreases to simulate the shadow of a passing cloud, the brightness of another adjacent or otherwise nearby lighting fixture 12A increases to compensate. Similar compensation can be performed for any light characteristic such as hue, saturation, color temperature, color rendering index, or the like. One or more sensors 36 in the sensor circuitry 34 of each of the lighting fixtures 12A may monitor the light output in the area to ensure that the general illumination parameters are maintained throughout the dynamic changing of the light output of the lighting fixtures 12A, adjusting the light output of one or more of the lighting fixtures 12A as necessary to maintain the general illumination parameters. Additionally, sensors on the lighting controls 12B or other devices 14 may be used to perform the same task. In another embodiment, the totality or average of the light output from multiple lighting fixtures 12A may change such that the general illumination parameters are maintained by an average light output of the lighting fixtures 12A over a predefined period of time, with instantaneous excursions from the general illumination parameters occurring. In such an embodiment, the predefined period of time may be chosen such that the excursions from the general illumination parameters are not disruptive to the individuals in the space.

Further to the above, the dynamic adjustment of the light output while maintaining the general illumination parameters may be accomplished by a single lighting fixture 12A or multiple lighting fixtures 12A. In the case of a single lighting fixture 12A, this may simply mean dynamically adjusting one or more characteristics of the light output thereof such that they change over time but remain within a range specified by the general illumination parameters, which prevent said dynamic adjustment from being too distracting or overwhelming. Using additional lighting fixtures 12A allows for more flexibility in the light output of each individual lighting fixture 12A, such that one or more of the lighting fixtures 12A can deviate one or more light output characteristics thereof from a given range in the general illumination parameters. This is because one or more other lighting fixtures 12A may compensate for the more intense dynamic adjustment of light output such that the average light output by the lighting fixtures 12A still remains within the general illumination parameters and thus is not too distracting or overwhelming.

Finally, a set of simulated environment general parameters (step 110) are used to dynamically adjust other environmental characteristics (step 112). As discussed herein, the simulated environment general parameters are any parameters not relating to illumination. These may include, for example, parameters for characteristics such as sounds, temperature, air circulation, and the like. In one exemplary embodiment in which the lighting fixtures 12A include speakers and/or one or more of the other devices 14 includes or is a speaker, the simulated environment general parameters may specify a set of sounds to be played within the indoor space to further evoke feelings of being in a desired outdoor or natural environment. Generally, the simulated environment general parameters supplement or enhance the simulated environment illumination parameters to make the experience more immersive. For example, sounds of rain, thunder, or wind may supplement the simulated environment illumination parameters associated with a rainy outdoor environment. Once again, sensors on the lighting fixtures 12A, the lighting controls 12B, or the other devices 14 may monitor the other environmental characteristics to ensure that the dynamic adjustment thereof falls below a set of general environment parameters such that individuals within the indoor space are not disrupted thereby.

The result of the above is a simulation of an outdoor or natural environment that subtly evokes a feeling of being in the desired outdoor or natural environment without being disruptive to the individuals in the indoor space such that they can still accomplish their desired tasks. Multiple environmental conditions such as light, sound, temperature, and the like may be dynamically changed together to provide cues relating to the desired outdoor or natural environment that are not overly distracting or overwhelming. Distributing the sources for these environmental conditions throughout a space may further enhance the experience. For example, the larger the number of lighting fixtures 12A that participate in the simulation, the more immersive it may be come. Similarly, if a number of speakers are distributed throughout the indoor space (in the lighting fixtures 12A or otherwise), the sound aspect of the simulation may become more immersive. Notably, the dynamic adjustment of the environmental conditions may be different for each device. For example, the lighting fixtures 12A may each dynamically change their light output in a different manner to better simulate what occurs in a natural outdoor environment. Similarly, speakers throughout a space may each play different sounds, all of which combine to evoke the outdoor or natural environment.

As discussed above, sound may be an important environmental characteristic used to evoke the cognitive impression of an outdoor or natural environment. Various examples of sounds that may be introduced via speakers distributed throughout an indoor space (in the lighting fixtures 12A or otherwise) may include the communications calls or sounds from flight or other motion of bees, birds, owls, crickets, cicadas, or other insects, sounds of the ocean (e.g., waves), running water in a stream, river, or waterfall, sounds from mammals such as cows, wolves, coyotes, horses, and dogs, ambient noises from city centers, cafes, coffee shops, and the like, sounds from flags, trees, grass, and leaves blowing in the wind, and sounds from natural phenomena such as thunder, rain, and the like.

As discussed briefly above, the general illumination parameters may include a range of values suitable for hue, saturation, brightness, color temperature, color rendering index, and the like. With respect to color temperature, this range may be between 1700 k to 8000 k, and more specifically 2700 k to 5700 k. With respect to color rendering index, this range may be between 60 and 100, and more specifically between 70 and 100 or 80 and 100. With respect to brightness, this range may be at least partially dependent on the type of light used. For a 2' by 2' lighting fixture of the type often mounted in a drop ceiling, a brightness between 2000 lux and 4000 lux may be used. For a 2' by 2' lighting fixture of the type often mounted in a drop ceiling, luminous flux emitted may be between 2000 lm and 5000 lm. For a 2' by 4' lighting fixture of the same type, a luminous flux between 3000 lm and 7000 lm may be used, dimming as requested to any intermediate level down to 5%, 1%, or even 0% of those ranges. This may translate to a brightness on task surfaces illuminated by the lights between about 30 foot-candles (300 lux) and 100 foot-candles (1000 lux), dimming as requested to any intermediate level down to 5%, 1%, or even 0% of those ranges. In terms of surface luminance of the self-luminous or illuminated surfaces of the fixture, this may be between 1000 nit (cd/m2) and 10,000 nit (cd/m2), subject to dimming in relative % as discussed above. The color temperature of the mixed illumination emitted by the fixture may be between 1000 k and 12,000 k, and the color rendering index of the mixed illumination emitted by the fixture may be between 65 and 100. In terms of the chromaticity of the top (Sky) panel, the typical adjustable color falls in a gamut triangle ranging from 0.2033, 0.0784 to 0.5157, 0.5731 to 0.2116, 0.4824 in u'v' space. In terms of the chromaticity of the side (Sun) panels, the typical adjustable color falls in a gamut triangle ranging from 0.1644, 0.4850 to 0.1624, 0.5510 to 0.4033, 0.5116 in u'v' space. While dependent on the light source, the clear aperture (the area of the virtual plane from which illumination exits) of each light source may be much larger than that typically seen in stage lighting scenarios, generally in excess of 4 square feet in the case of square ceiling mounted troffer-type lighting fixtures and down to 1 square foot in the case of certain recessed downlights such as a 6" round downlight. Further, the light is much more uniform than that used in stage lighting scenarios, such that a luminance uniformity thereof is better than +/−15% across the whole of the luminous surface of the top (Sky) panel or across each of the side (Sun) panels. Color uniformity may be better than +1=0.005 or 0.010 in u'v' color space across these same surfaces. Beam angle for the lights may be between 60 and 140 degrees full width half max. Beam candlepower may be between 10 and 1000 cd.

The simulated environment illumination parameters and the simulated environment general parameters may include a predefined set of parameters that specify variations in light or other environmental characteristics over time. That is, the simulated environment illumination patterns and the simulated environment general parameters may define values for illumination (e.g., hue, saturation, brightness, color temperature, color rendering index, or the like) or other environmental characteristics (e.g., sound, temperature, air circulation, or the like) that vary over time and are "played" to simulate the outdoor or natural environment. Additionally, the simulated environment illumination patterns and the simulated environment general parameters may be dynamically generated based on predefined criteria associated with a variety of outdoor or natural environments.

Figure 4:
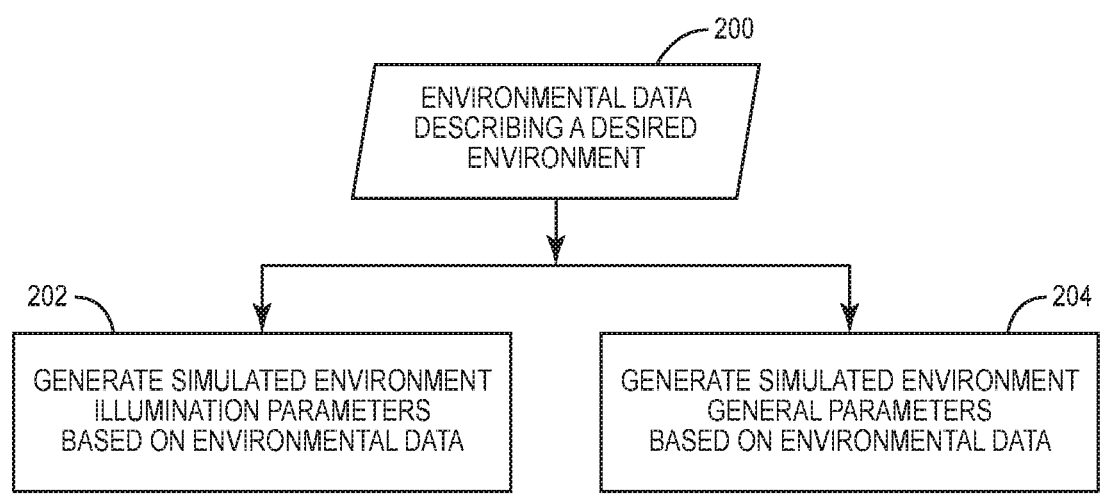
FIG. 4 is a flow diagram illustrating a process of obtaining a set of simulated environment illumination parameters and simulated environment general parameters according to one embodiment of the present disclosure.

In this regard, FIG. 4 illustrates a process for obtaining the simulated environment illumination parameters and the simulated environment general parameters. Starting with environmental data describing a desired environment (step 200), the simulated environment illumination parameters are dynamically generated (step 202) and the simulated environment general parameters are dynamically generated (step 204). The environmental data describing a desired environment may include illumination conditions and other environmental conditions such as weather information, sounds, and the like. The environmental data may be stored in a database or obtained from a sensor. If the environmental data is obtained from a sensor, the sensor may be local (i.e., outside but near the indoor space such that it is connected via a LAN) or remote (i.e., in a completely different location and connected via WAN). The environmental data may be any level of granularity and processing. In some embodiments, the environmental data is raw sensor data that is then processed to generate the simulated environment illumination parameters and the simulated environment general parameters. In other embodiments the environmental data is pre-processed in some way.

FIG. 5 illustrates a process for obtaining the simulated environment illumination parameters and the simulated environment general parameters according to another embodiment of the present disclosure. The process once again starts with the environmental data describing the desired environment (step 300), which, as discussed above can be raw sensor data or pre-processed data about the desired environment. This environmental data is matched to a number of predefined environmental conditions (step 302). For example, sensor data may be examined to see if it is raining outside. If so, this is matched to a predefined environmental condition for "rainy," which is used to retrieve a set of predefined simulated environment illumination parameters and predefined simulated environment general parameters (step 304).

Notably, the above ways to obtain the simulated environment illumination parameters and the simulated environment general parameters are merely exemplary. The simulated environment illumination parameters and the simulated environment general parameters may be obtained in any suitable manner without departing from the principles herein.

The process described above for simulating an environment in an indoor space is intended for use with lighting fixtures 12A typically found in commercial spaces such as downlights and troffers provided in a drop ceiling. With this in mind, certain types of lighting fixtures 12A may be especially suited to simulating outdoor environments. In particular, lighting fixtures 12A that imitate the light provided from a skylight, such as those described in co-assigned U.S. Pat. No. 10,502,374, the contents of which are hereby incorporated by reference in their entirety, may be especially well suited to imitating outdoor or natural lighting conditions. These types of lighting fixtures may give the subtle impression of a recessed skylight, and may include a top panel capable of illuminating a highly uniform visible surface with a color like the clear blue sky, a cloudy sky, or any blend therebetween. The fixture may include any number of sidewalls also capable of displaying a highly uniform surface color. The top panel and sidewalls may change their color based on the time of day or any other pattern to give the impression of a skylight at different times of day. FIG. 6 shows an exemplary skylight lighting fixture 42 according to one embodiment of the present disclosure. The skylight lighting fixture 42 includes a first light engine 44, a second light engine 46, and a first sidewall 48 that defines a space (in the form of a recessed box, i.e., a horizontal plane through the first sidewall 48 would intersect the first sidewall 48 in a hollow square pattern). The skylight lighting fixture 42 is mounted in a ceiling 50 which adjoins a wall 52. A beam of light 54 exits from the second light engine 46.

The first light engine 44 comprises an edge-lit panel (or direct-lit panel), and the second light engine 46 comprises a downlight. The first sidewall 48 comprises at least a first sidewall aperture 56. The second light engine 46 is positioned and oriented such that light therefrom passes through the first sidewall aperture 56 through an optional screen 58 covering the first sidewall aperture 56. A low-profile sensor pod 60 may be mounted in or on the ceiling 50 and include at least an ambient light sensor, or a PIR occupancy sensor in addition to any other sensors. To maintain the low profile of such a sensor pod 60, a flat lens system for the PIR occupancy sensor may be required, such as that described in detail in co-assigned U.S. Pat. No. 10,234,121, the contents of which are hereby incorporated by reference in their entirety. Details of the skylight lighting fixture 42 are discussed in detail in U.S. Pat. No. 10,502,374 incorporated above. The light provided by the first light engine 44 and the second light engine 46 is capable of imitating that provided by a skylight on a sunny day. Adjusting the light output of the first light engine 44 and the second light engine 46 according to the principles discussed above may enable other environmental conditions (e.g., cloudy, rainy, etc.) to be imitated quite accurately as well. Accordingly, one or more of the lighting fixtures 12A in the lighting network 10 discussed above may comprise a skylight lighting fixture such as the one described herein.

FIG. 7 shows a downlight style lighting fixture 62 according to one embodiment of the present disclosure. The downlight style lighting fixture 62 includes a housing 64, which supports a light source (not shown) from which light is provided. A lens 66 covers the light source and may filter light emanating therefrom. An electronics module (not shown) may be located within the housing 64, and may include various circuitry, such as that described above with respect to FIG. 2, configured to control one or more light output parameters of the light source and perform one or more additional functions. A reflector (not shown) may be attached to the housing 64, for example, via one or more mounting holes 68, which may extend the housing 64 such that the downlight style lighting fixture 62 may be used as a recessed lighting fixture for hanging in an opening in a ceiling.

FIG. 8 shows a troffer style lighting fixture 70 according to one embodiment of the present disclosure. The troffer style lighting fixture 70 includes a housing 72, which supports a light source (not shown) from which light is provided. A heat sink 74 may be coupled to the light source in order to divert heat away from the light source. Light from the light source may be provided indirectly such that the light provided from the light source is reflected from an inside portion of the housing 72 and through a lens 76. The lens 76 may filter the light emanating from the light source. An outer surface 78 of the housing 72 may act as a reflector, directing light from the light source in a desired direction. An electronics module (not shown) may be located within the housing 72, and may include various circuitry such as that discussed above with respect to FIG. 2.

Figure 9:
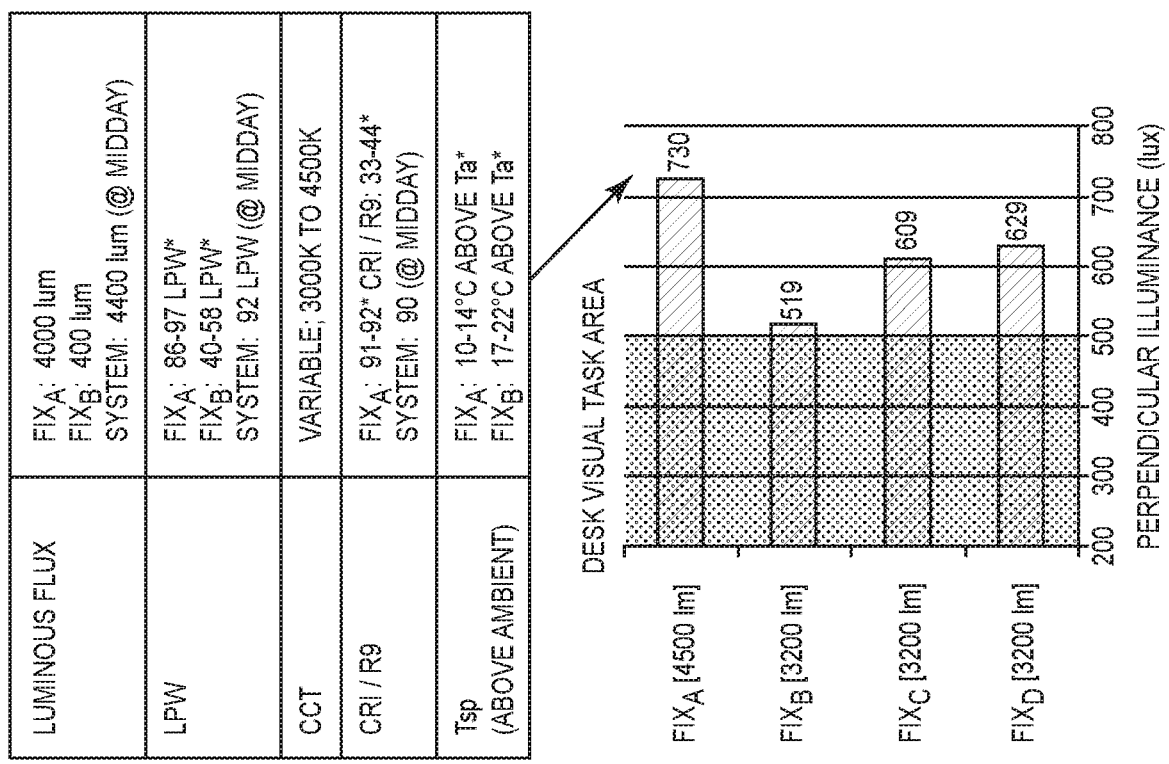

FIG. 9 illustrates exemplary conditions for a lighting system suitable for general illumination. Starting in the opt left, measurements for luminous flux, lumens per watt (LPW), correlated color temperature (CCT), color rendering index (CRI), and solder point temperature (Tsp) are shown for a first lighting fixture $FIX_A$ and a second lighting fixture $FIX_B$, which may be different types of lighting fixtures. In the lower left, a graph displays suitable values for perpendicular luminance in lux for a first lighting fixture $FIX_A$, a second lighting fixture $FIX_B$, a third lighting fixture $FIX_D$, and a fourth lighting fixture $FIX_D$. On the right, a diagram indicates the different illumination areas over which general illumination parameters can be measured and enforced.

Figure 10:
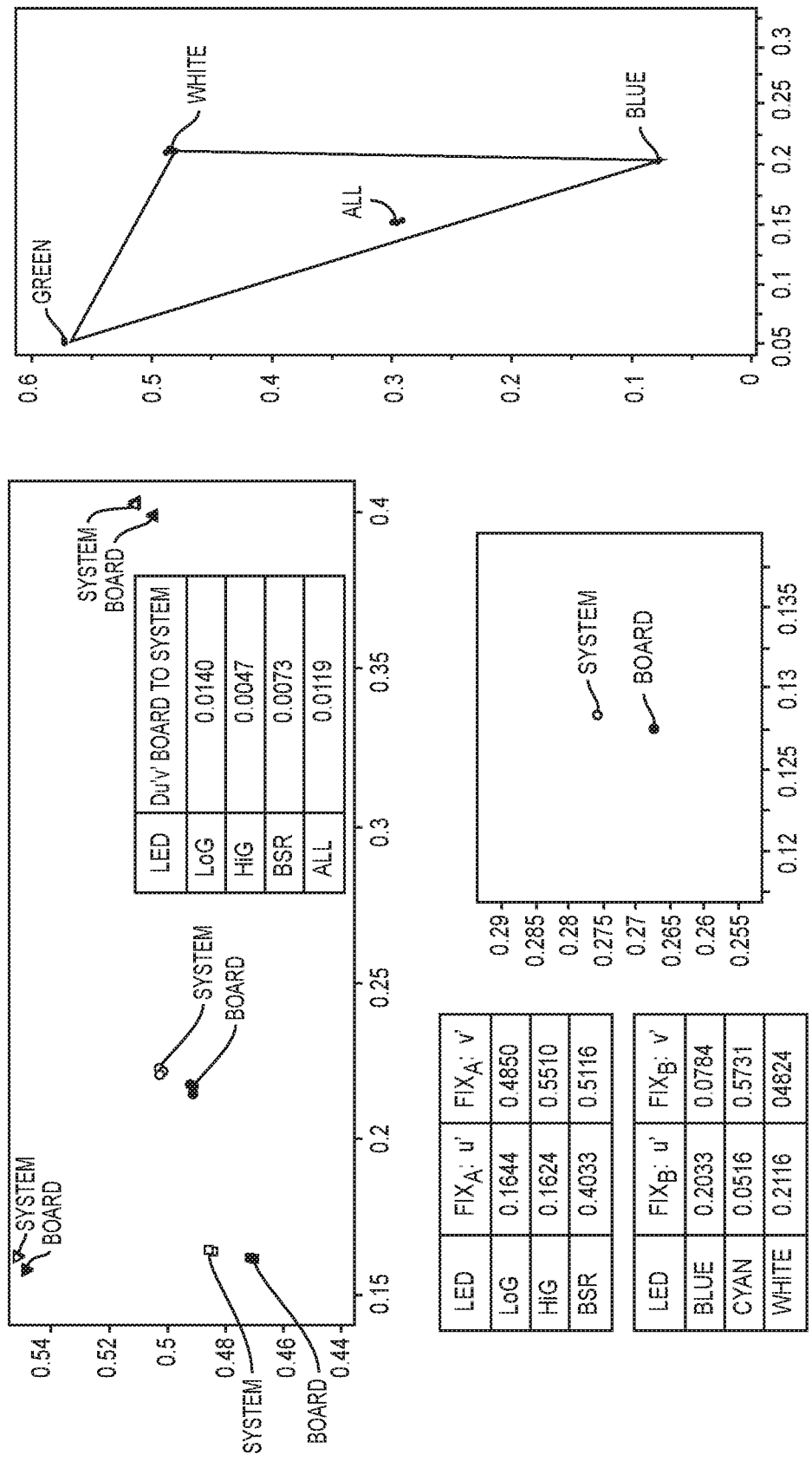

FIG. 10 includes a number of color gamut triangles for various lighting fixtures, and may illustrate values that are suitable for general illumination that may be included in the general illumination parameters in some embodiments. Certain points on the color gamut triangles are specified for a bare board system (e.g., a light engine), while others specify the points for a lighting system, which may include multiple light engines. Color space measurements for different fixtures ($FIX_A$ and $FIX_B$) may indicate acceptable color space values that may be included in the general illumination parameters in various embodiments.

Figure 11:
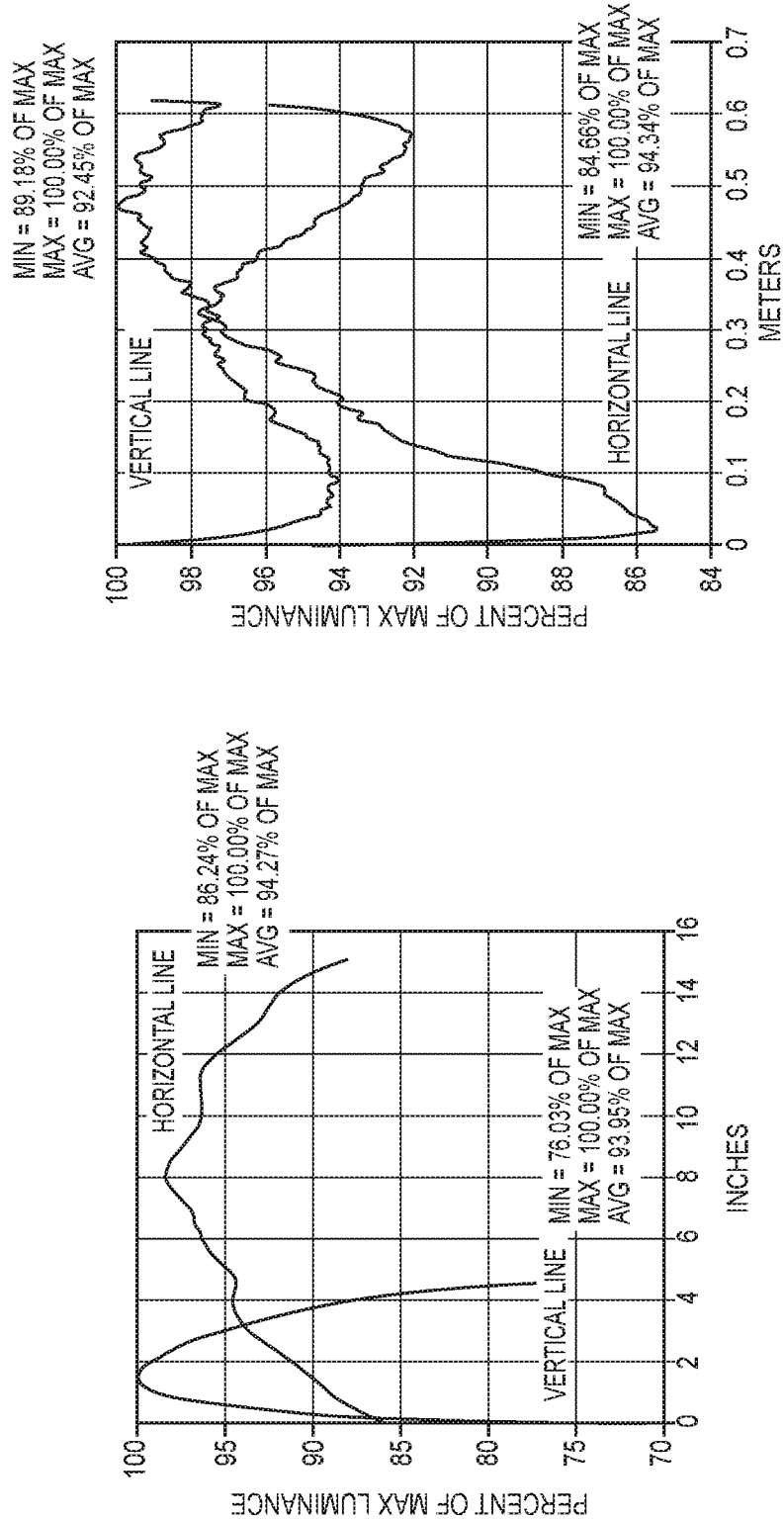

FIG. 11 shows graphs illustrating luminance ranges for a first lighting fixture and a second lighting fixture, measured in both horizontal and vertical axes from the lighting fixtures. These luminance ranges and their uniformity may be included in the general illumination parameters in various embodiments.

Figure 12:
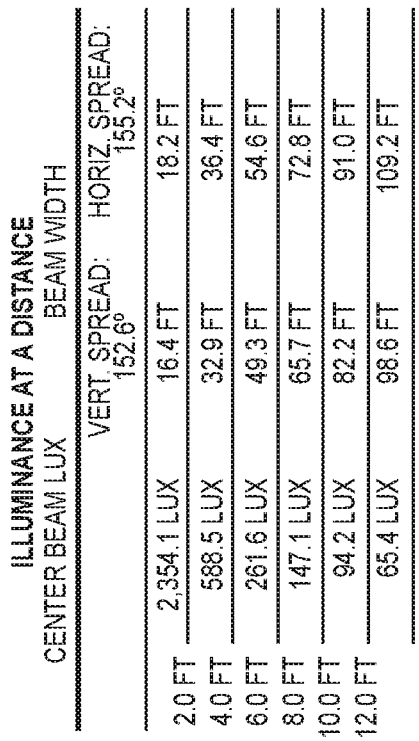
Figure 12:
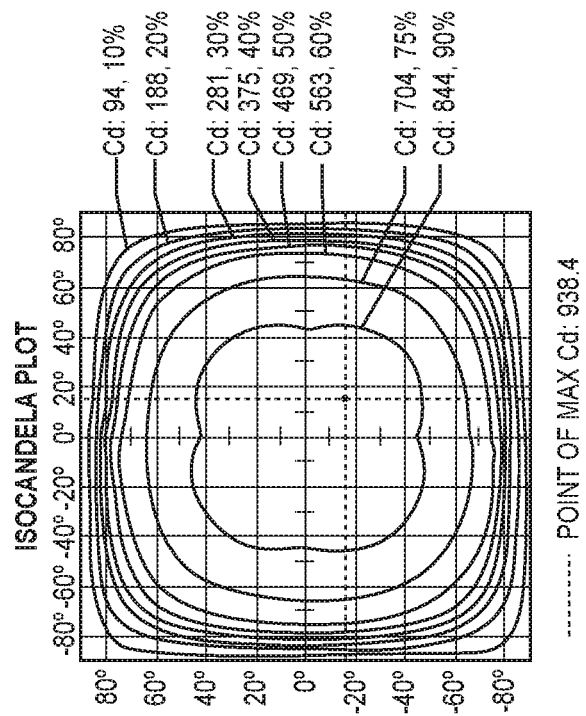
Figure 12:
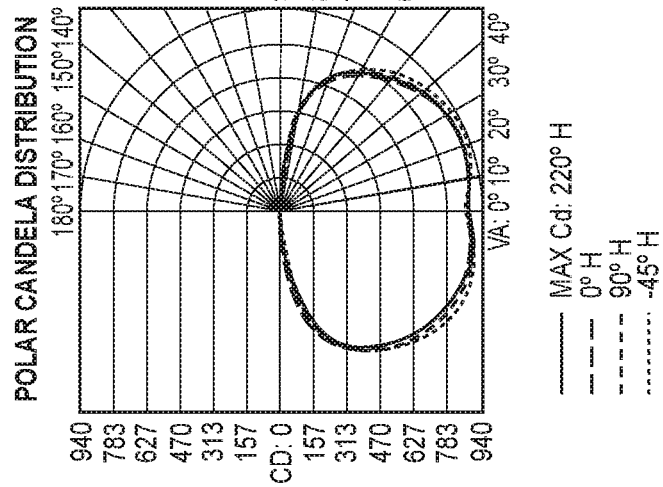

FIG. 12 shows graphs indicating parameters that may be included in the general illumination parameters specifying illumination at a distance (top middle), polar candela distribution (bottom left), and values in an isocandela plot (bottom right). These parameters may be included in the general illumination parameters in various embodiments.

Those skilled in the art will recognize improvements and modifications to the preferred embodiments of the present disclosure. All such improvements and modifications are considered within the scope of the concepts disclosed herein and the claims that follow.

What is claimed is:

1. A method for simulating a natural environment in an indoor space comprising:
   providing light from one or more light sources based on general illumination parameters, wherein the general illumination parameters specify one or more light output characteristics that are suitable for general illumination; and
   dynamically adjusting the one or more light output characteristics of the light provided from the one or more light sources to simulate light provided in an outdoor environment while maintaining the light output characteristics of the light provided from the one or more light sources within the general illumination parameters comprising ensuring that an average light output of the one or more light sources is within the general illumination parameters.

2. The method of claim 1 wherein the general illumination parameters include one or more of hue, saturation, brightness, color, color temperature, and color rendering index.

3. The method of claim 1 wherein dynamically adjusting the one or more light output characteristics of the light provided from the one or more light sources to simulate the light provided in the outdoor environment while maintaining the light output characteristics of the light provided from the one or more light sources within the general illumination parameters comprises:
   adjusting light output of a first light source; and
   compensating for the adjustment of the first light source with a second light source such that the average light output of the first light source and the second light source remains within the general illumination parameters.

4. The method of claim 3 wherein the one or more light sources comprise lighting fixtures comprising a plurality of light emitting diodes (LEDs).

5. The method of claim 4 further comprising measuring the one or more light output characteristics using sensors on each one of the lighting fixtures.

6. The method of claim 5 wherein dynamically adjusting the one or more light output characteristics of the light provided from the one or more light sources to simulate the light provided in the outdoor environment while maintaining the light output characteristics of the light provided from the one or more light sources within the general illumination parameters is performed based on measurements obtained by the sensors on each one of the lighting fixtures.

7. The method of claim 1 wherein dynamically adjusting the one or more light output characteristics of the light provided from the one or more light sources to simulate the light provided in the outdoor environment while maintaining the light output characteristics of the light provided from the one or more light sources within the general illumination parameters comprises ensuring that the average light output of the one or more light sources within a predefined period of time is within the general illumination parameters.

8. The method of claim 1 further comprising:
controlling one or more environmental conditions based on general environmental parameters, wherein the general environmental parameters specify one or more environmental parameters that are suitable for an indoor working environment; and
dynamically adjusting the one or more environmental conditions to simulate environmental conditions of the outdoor environment while maintaining the environmental conditions within the general environmental parameters.

9. The method of claim 8 wherein the one or more environmental parameters include sound, temperature, and air circulation.

10. The method of claim 1 wherein dynamically adjusting the one or more light output characteristics of the light provided from the one or more light sources to simulate the light provided in the outdoor environment while maintaining the light output characteristics of the light provided from the one or more light sources within the general illumination parameters comprises independently adjusting the one or more light output characteristics of each of the one or more light sources.

11. The method of claim 1 wherein dynamically adjusting the one or more light output characteristics of the light provided from the one or more light sources to simulate the light provided in the outdoor environment while maintaining the light output characteristics of the light provided from the one or more light sources within the general illumination parameters is performed based on sensor data describing the outdoor environment.

12. An intelligent lighting network comprising:
a plurality of lighting fixtures, each one of the plurality of lighting fixtures comprising:
a light source;
processing circuitry; and
a memory storing instructions, which, when executed by the processing circuitry cause the lighting fixture to:
provide light based on general illumination parameters via the light source, wherein the general illumination parameters specify one or more light output characteristics that are suitable for general illumination; and
dynamically adjust the one or more light output characteristics of the light provided from the light source to simulate light provided in an outdoor environment while maintaining the light output characteristics in a space in which the lighting fixture is located within the general illumination parameters comprising ensuring that an average light output of the one or more light output characteristics remains within the general illumination parameters.

13. The intelligent lighting network of claim 12 wherein the general illumination parameters include one or more of hue, saturation, brightness, color, color temperature, and color rendering index.

14. The intelligent lighting network of claim 12 wherein dynamically adjusting the one or more light output characteristics of the light provided from the light source to simulate the light provided in the outdoor environment while maintaining the light output characteristics in the space in which the lighting fixture is located within the general illumination parameters comprises cooperating with one or more neighboring lighting fixtures to ensure that when the one or more light output characteristics of the light from the light source of the lighting fixture are adjusted, the one or more neighboring lighting fixtures compensate for the adjustment of the one or more light output characteristics of the light from the light source of the lighting fixture such that the average light output of the lighting fixture and the one or more neighboring lighting fixtures remains within the general illumination parameters.

15. The intelligent lighting network of claim 12 wherein the light source comprises one or more light emitting diodes (LEDs).

16. The intelligent lighting network of claim 12 wherein each one of the lighting fixtures further comprises sensor circuitry configured to measure the one or more light output characteristics.

17. The intelligent lighting network of claim 16 wherein dynamically adjusting the one or more light output characteristics of the light provided from the light source to simulate the light provided in the outdoor environment while maintaining the light output characteristics in the space in which the lighting fixture is located within the general illumination parameters is performed based on measurements of the one or more light output characteristics from the sensor circuitry on each one of the plurality of lighting fixtures.

18. The intelligent lighting network of claim 12 wherein dynamically adjusting the one or more light output characteristics of the light provided from the light source to simulate the light provided in the outdoor environment while maintaining the light output characteristics in the space in which the lighting fixture is located within the general illumination parameters comprises ensuring that the average light output of the one or more light output characteristics within a predetermined period of time remains within the general illumination parameters.

\* \* \* \* \*